United States Patent [19]

Suzue et al.

[11] Patent Number: 5,245,779
[45] Date of Patent: Sep. 21, 1993

[54] FISHING ROD AND OTHER TUBULAR BODIES

[75] Inventors: Hiroyasu Suzue; Masaru Akiba, both of Tokyo, Japan

[73] Assignee: Daiwa Seiko, Inc., Tokyo, Japan

[21] Appl. No.: 777,462

[22] Filed: Oct. 17, 1991

Related U.S. Application Data

[63] Continuation of Ser. No. 405,878, Sep. 11, 1989, abandoned.

[30] Foreign Application Priority Data

Sep. 19, 1988 [JP] Japan .............................. 63-235592

[51] Int. Cl.⁵ ............................................. A01K 87/00
[52] U.S. Cl. ................................... 43/18.5; 43/18.1; 428/36.91; 428/395; 428/377
[58] Field of Search ..................... 43/18.1, 18.5; 428/36.3, 36.91, 395, 364, 377, 375, 367, 365, 392

[56] References Cited

U.S. PATENT DOCUMENTS

| | | | |
|---|---|---|---|
| 4,010,054 | 3/1977 | Bradt | 156/173 |
| 4,061,806 | 12/1977 | Lindler et al. | 43/18.5 |
| 4,604,319 | 8/1986 | Evans et al. | 428/334 |
| 4,770,915 | 9/1988 | Nakagawa et al. | 428/401 |
| 4,812,186 | 3/1989 | McConnell et al. | 428/317.1 |
| 4,920,005 | 4/1990 | Mercer | 428/419 |
| 4,954,382 | 9/1990 | Riefler et al. | 428/414 |

OTHER PUBLICATIONS

1983 General Electric Report, Ultem Products Section. Apr. 26, 1983, E76136(M).

*Primary Examiner*—Mark Rosenbaum
*Assistant Examiner*—James Miner
*Attorney, Agent, or Firm*—Kalish & Gilster

[57] ABSTRACT

The present invention relates to a tubular body such as a fishing rod or a golf club shaft. According to the present invention, a tubular body is made of reinforcing fibers impregnated with synthetic resin, having a reinforcing layer made of thermoplastic amorphous polymer fibers thereon. Therefore, the thermoplastic amorphous polymer fibers absorb the impact and keep the body proper free from being destroyed or damaged when the tubular body is shocked. In the case of a fishing rod, said fibers absorb and lessen noise so that only a bite of a fish can easily be noticed. In the case of a golf club shaft, the fibers lessen the impact vibration when the sweet spot of the club hits the ball so that it is possible to know whether the club head has hit the ball without fail.

9 Claims, 2 Drawing Sheets

FISHING ROD AND OTHER TUBULAR BODIES

CROSS-REFERENCE TO RELATED APPLICATIONS

This is a continuation of application Ser. No. 07/405,878, filed Sep. 11, 1989, now abandoned.

BACKGROUND OF THE INVENTION

1. Field of the Invention

This invention relates to improvement in a long-sized body such as a fishing rod, a golf club shaft and the like.

2. Description of the Prior Art

The conventional long-sized bodies of this kind are tubular or solid. An example of such tubular bodies has been disclosed in Japanese Utility Model Publication No. 58-49105, in which the outer surface of a tubular body which has been made by wrapping prepreg sheet of reinforcing fibers such as carbon fibers impregnated with epoxy resin around a mandrel is bound with glass, carbon, or aramide fibers as done with a tape.

As stated above, the strength of the conventional tubular body is increased by attaching strong fibers around it.

Although the fibers wrapping the outer surface of the tubular body are strong enough, their extensibility is low so that they do not easily stick to the epoxy resin which forms the tubular body. Besides, the epoxy resin which forms the tubular body has a low impact-strength. Therefore, the tubular body made of the above materials has the following defects:

(1) It easily breaks and gets damaged. Conventionally, the coat had to be made thicker for better reinforcement to prevent this.

(2) It lacks flexibility; it is not swung smoothly, giving some shock. The feeling of a bite or impact with it was often incongruous.

(3) The impact caused by a collision of tubular bodies easily brings a crack or chip especially at the end of the bodies.

(4) Since parts to be mounted on the tubular body are formed as a unit, or mounted using reinforcing fibers, these mounting sections are loaded and may be damaged.

SUMMARY OF THE INVENTION

An object of the present invention, which is intended to remedy the drawbacks of the prior arts, is to provide a long-sized body such as a fishing rod with increased strength by using high-shock-resistant thermoplastic amorphous polymer fibers with extensibility as a reinforcing material.

A long-sized body such as a fishing rod according to the present invention is made of reinforcing fibers impregnated with synthetic resin, having a reinforcing layer made of thermoplastic amorphous polymer fibers thereon.

The thermoplastic amorphous polymer fibers are shaped into a thread, fabric, bonded fabric, film, tape, or tube, and provided at a point or a plurality of points on or near the outer or inner surface or either end of a long-sized body made of reinforcing fibers impregnated with synthetic resin. The long-sized body made of reinforcing fibers impregnated with synthetic resin is tubular or solid.

A long-sized body proper according to the invention is made of reinforcing fibers such as carbon fibers, glass fibers, or aramide fibers and a matrix resin such as epoxy resin which are all strong and rigid, with thermoplastic amorphous polymer fibers provided at a point or a plurality of points on or near the outer or inner surface or either end thereof, therefore the thermoplastic amorphous polymer fibers absorb the impact and keep the body proper free from being destroyed or damaged when the long-sized body is shocked. In the case of a fishing rod, said fibers absorb and lessen "noise" so that only a bite of a fish can easily be noticed. In the case of a golf club shaft, the fibers lessen the impact vibration when the sweet spot hits a golf ball, so that it is possible to know whether the club has hit the ball without fail.

DESCRIPTION OF THE PREFERRED EMBODIMENT OF THE INVENTION

Embodiments of the present invention will be explained below with reference to the attached drawings.

Figure 1:
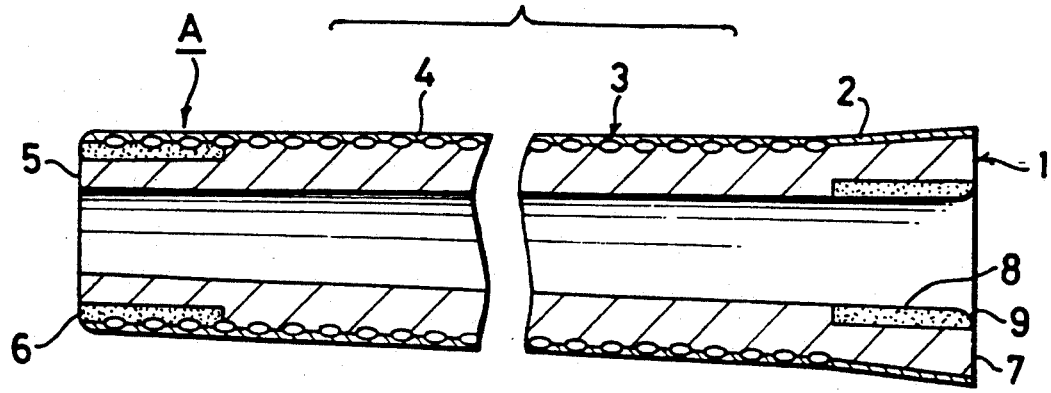
FIG. 1 is a sectional view of an embodiment of the present invention applied to a fishing rod.

FIG. 1 shows an embodiment of the present invention, in which the numeral 1 shows a tubular fishing rod proper.

The fishing rod proper 1 is made, in the same way as with the conventional ones, by wrapping prepreg sheet of reinforcing fibers such as glass, carbon, or aramide fibers impregnated with epoxy resin around a mandrel.

An outer reinforcing layer 3 which is made of a fabric composed of thermoplastic amorphous polymer fibers such as PEI (polyether imide) fiber is provided as a unit on the outer surface of the above fishing rod proper 1 except a tapered joint section 2 at an end thereof.

An example of PEI (polyether imide) fibers has the following molecular structure:

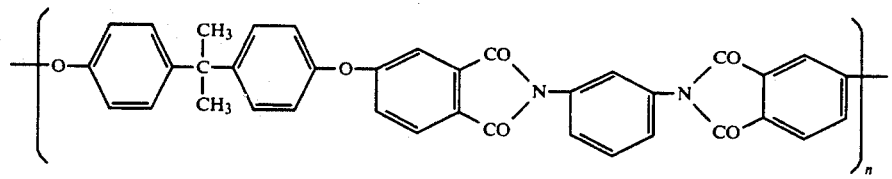

The properties of the above PEI (polyether imide) fibers are illustrated here.

A variety of yarn counts are available (presently, fibers of 170 denier are mass-produced). The breaking extension is very high, ranging from 40 to 50%. The specific gravity is 1.27 (which is lower than carbon fibers 1.7, Kevlar 1.45, and glass fibers 2.45). They have transparency, so the molded product is transparent. It has a good wettability with epoxy resin. The shearing strength (wettability) between layers is not less than 6.0 kg/mm$^2$. The strength is 2300–3000 kg/cm$^2$.

The afore-said outer reinforcing layer 3 is applied with a desired coating to form a coating layer 4 thereon.

At an end 5 of the fishing rod proper 1 is buried an end reinforcing layer 6 which is made of fabrics composed of thermoplastic amorphous polymer fiber such as PEI (polyether imide) fiber. And the outer surface of the end reinforcing layer 6 is integrally provided with the outer reinforcing layer 3.

In an inner wall 8 at a base 7 of the fishing rod proper 1 is also buried an inner reinforcing layer 9 which is made of fabrics composed of thermoplastic amorphous polymer fibers such as PEI (polyether imide) fibers.

The manufacturing process of a fishing rod A according to the embodiment thus made will be illustrated below.

Figure 2A:
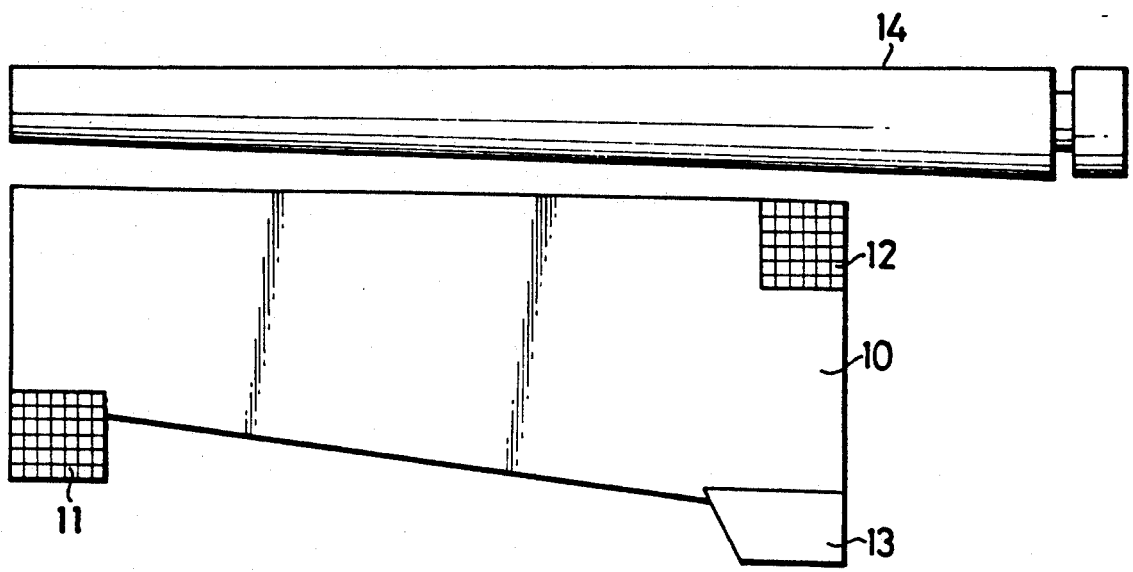
FIG. 2 (a)-(c) is an explanatory view of the fishing rod shown in FIG. 1, showing the manufacturing process.
Figure 2B:
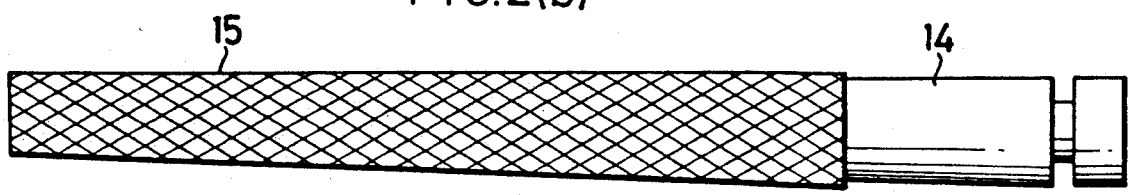
Figure 2C:
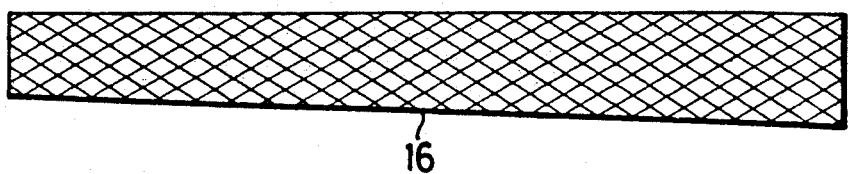

First, as shown in FIG. 2 (a), fabrics 11 composed of thermoplastic amorphous polymer fibers for forming the end reinforcing layer 6, fabrics 12 composed of thermoplastic amorphous polymer fibers for forming the inner reinforcing layer 9, and a prepreg sheet 13 for forming the tapered joint section 2 are pasted on a prepreg sheet 10 which is cut trapezoid to form the fishing rod 1. Then the sheet 10 is wrapped around a mandrel 14.

Second, as shown in FIG. 2 (b), fabrics 15 composed of thermoplastic amorphous polymer fibers for forming the outer reinforcing layer 3 are cross-wound densely at certain intervals. The interval is preferably not more than 4 mm, depending on the conditions such as fiber's thickness or the diameter of the mandrel 14.

Then after being taped and cured, a tubular body 16 is, as shown in FIG. 2 (c), drawn out from the mandrel 14. The tubular body 16 is polished on its surface, machined both ends, and coated before being made into the fishing rod A.

In this fishing rod A according to the above embodiment, strength and rigidity are, similar to the conventional fishing rods, realized by the tubular body which is formed of the cured prepreg sheet 10 of fibers such as glass, carbon, or aramide fibers which constitute the fishing rod A, the said fibers being impregnated with a matrix resin such as epoxy resin; the shock resistance and good feeling and condition in use are realized by the outer reinforcing layer 3, end reinforcing layer 6, and inner reinforcing layer 9 all of which are made of the fabrics 15 composed of thermoplastic amorphous polymer fibers with high elasticity and high strength. Since the thermoplastic amorphous polymer fibers have a good toughness and extension, the rod has an extremely high shock-resistance. Therefore, even if it is shocked or hits a stone, it is rarely broken or damaged. Since the thermoplastic amorphous polymer fibers also have a good wettability, resin easily spreads at processing, providing a good moldability. This is because the thin coating can be applied to save weight. Since the thermoplastic amorphous polymer fibers also have a high extensibility, the rod rarely breaks when deformed and it provides a smooth swing giving no shock unlike the conventional fishing rods.

The end reinforcing layer 6 is buried at the end 5, preventing cracking, breaking, or chipping of the end 5.

The inner reinforcing layer 9 is buried in the inner wall 8 at the base 7, preventing burring or breaking at the joint when connected.

The fishing rod A also absorbs and lessens noise so that only a bite by a fish can easily be noticed.

Referring to an embodiment shown in FIG. 1, the inner reinforcing layer 9 may be extended to the end 5.

The thermoplastic amorphous polymer fibers, which are transparent, make a nameplate or the like visible as well as protect it if the nameplate or the like is placed on the tubular body and the outer reinforcing layer 3 is applied thereon.

According to the embodiment of the invention, the outer reinforcing layer 3, end reinforcing layer 6 and inner reinforcing layer 9 are made of fabrics, but single thread, yarn, bonded fabrics, films, tapes, or tubes may also be available. In the case of fabrics or bonded fabrics, they may be pregnated with resin if the base material is short of resin.

Figure 3:
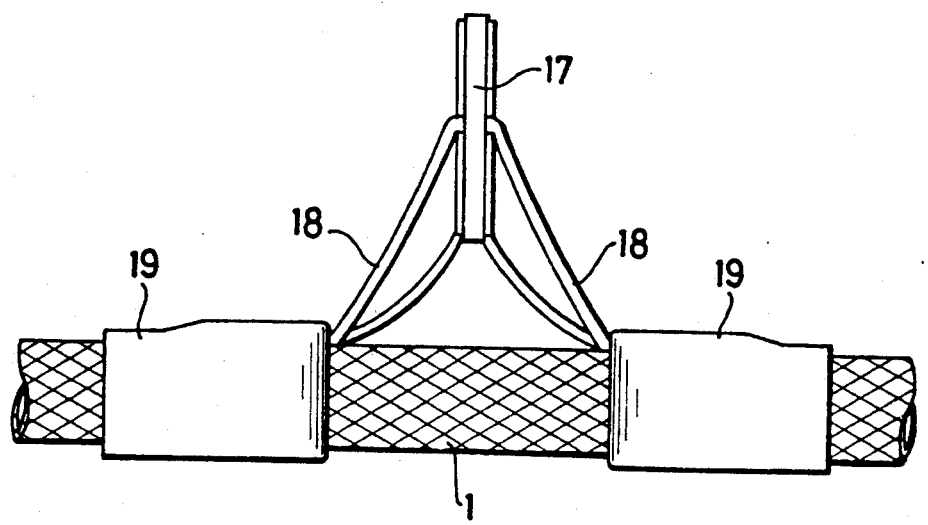
FIG. 3 is an enlarged view of a fishing-line guide secured on a fishing rod according to the present invention.

FIG. 3 shows a fishing-line guide 17 secured on the fishing rod A shown in FIG. 1.

The fishing-line guide 17 is placed at a certain point of the fishing rod proper 1, a foot 18 being bound with threads or tapes made of thermoplastic amorphous polymer fibers such as PEI (polyether imide) fibers to form guide-fixing members 19, 19. These guide-fixing members 19, 19 are cured and made as a unit.

Since the guide-fixing members 19, 19 are made of thermoplastic amorphous polymer fibers which have a good wettability, toughness, and extensibility, their adhesiveness and fixing strength have significantly improved compared with those of the conventional fixing members, and absorb the load applied thereon, keeping the fishing rod A from unnecessary force being applied and preventing the fishing-line guide 17 from being disconnected.

Figure 4:
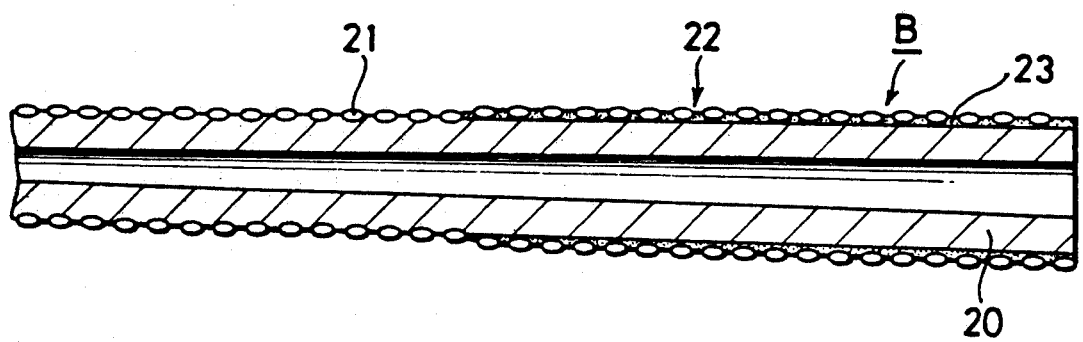
FIG. 4 is a sectional view of an embodiment of the present invention applied to a golf club.

FIG. 4 shows an embodiment of the invention applied to a golf club shaft, in which 20 shows a tubular golf club shaft proper.

The golf club shaft proper 20 is made, in the same way as the above-stated fishing rod proper 1, by wrapping prepreg sheet of reinforcing fibers such as glass, carbon, or aramide fibers impregnated with epoxy resin around a mandrel.

An outer reinforcing layer 21 which is made of a fabric composed of thermoplastic amorphous polymer fibers such as PEI (polyether imide) fiber is integrally provided on the outer surface of said golf club shaft proper 20. And around a grip section 22, thermoplastic amorphous polymer 23 fills in the fabrics which form the outer reinforcing layer 21. A desired grip is mounted on the grip section 22.

The golf club shaft B is manufactured in the same way as the above fishing rod A.

Referring to the golf club shaft B, it provides the same function and effect as the fishing rod A does, having the following characteristics.

The impact vibration (a strange feeling of impact on the body or hands) when the sweet spot of the club hits the ball can be lessened, so it is easy to know which part of the club head has hit the ball and a feeling of a good swing (or bad swing) can be obtained.

In this embodiment of the invention, no coating layer is formed in the section where the outer reinforcing layer 21 is provided. When the surface of the fibers is uneven, which depends on the pressure at molding, the fiber's thickness, and the resin content of the body, a coating may be applied.

When the present invention is applied to the grip of a fishing rod, the layer which forms the fishing rod proper is exposed at such places as fingers touch. The exposed layer allows slight vibration to be noticed easily, and because the other part is coated with thermoplastic amorphous polymer fibers, the layer also lessens transmitted slight vibration.

Although the above stated embodiments illustrated refer to tubular bodies, the present invention can also be applied to something solid as well, such as a tip of a fishing rod. If applied as above, the body may be lighter in weight because thermoplastic amorphous polymer fibers have a lower specific gravity than carbon fibers, in addition to the function and effect stated above.

In the embodiments of the invention, thermoplastic amorphous polymer fibers are provided on the outer and inner layers and the opposite ends of the long-sized body which is formed of reinforcing fibers impregnated with synthetic resin. But thermoplastic amorphous polymer fibers may be provided to such places as required to provide an improved strength. For example, they may be provided at a point or a plurality of points on or near the outer or inner surface or either end.

It is to be understood that the foregoing description is merely illustrative of the preferred embodiments of the present invention, but that the present invention is not to be limited thereto, but is to be determined by the scope of the appended claims.

What is claimed is:

1. A tubular body having two ends and inner and outer surfaces and being characterized by said tubular body comprising reinforcing fibers selected from the group consisting of glass, carbon and aramide which are impregnated with thermosetting synthetic resin to form a tubular body proper on the surface of which is added a reinforcing layer made of thermoplastic amorphous high molecular fibers on at least one point substantially on at least one of the surfaces and on at least one of the ends of the tubular body.

2. A tubular body according to claim 1, wherein the reinforcing layer formed from the thermoplastic amorphous high molecular fibers is formed as a thread.

3. A tubular body according to claim 1, wherein the reinforcing layer formed from the thermoplastic amorphous high molecular fibers is formed as a fabric.

4. A tubular body according to claim 1, wherein the reinforcing layer formed from the thermoplastic amorphous high molecular fibers is formed as a bonded fabric.

5. A tubular body according to claim 1, wherein the reinforcing layer formed from the thermoplastic amorphous high molecular fibers is formed as a film.

6. A tubular body according to claim 1, wherein the reinforcing layer formed from the thermoplastic amorphous high molecular fibers is formed as a tape.

7. A tubular body according to claim 1, wherein the reinforcing layer formed from the thermoplastic amorphous high molecular fibers is formed as a tube.

8. A tubular body according to claim 1, wherein said reinforcing layer is made of thermoplastic amorphous polyether imide resin fibers having the following molecular structure:

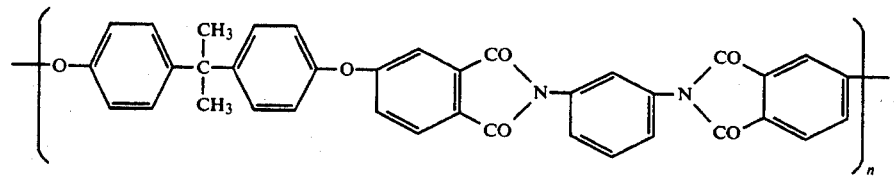

9. A tubular body according to claim 1, wherein said tubular body is a cured prepreg sheet shaped as a tube and said thermosetting synthetic resin is an epoxy resin.

* * * * *